United States Patent [19]

Krounbi et al.

[11] Patent Number: 4,713,708
[45] Date of Patent: Dec. 15, 1987

[54] MAGNETORESISTIVE READ TRANSDUCER

[75] Inventors: Mohamad T. Krounbi, San Jose; Otto Voegeli, Morgan Hill, both of Calif.

[73] Assignee: International Business Machines, Armonk, N.Y.

[21] Appl. No.: 926,076

[22] Filed: Oct. 31, 1986

[51] Int. Cl.[4] .............................................. G11B 5/30
[52] U.S. Cl. ................................................ 360/113
[58] Field of Search ................ 360/113, 126; 324/252; 338/32 R

[56] References Cited

U.S. PATENT DOCUMENTS

| | | | |
|---|---|---|---|
| 3,864,751 | 2/1975 | Beaulieu et al. | 360/113 |
| 3,887,944 | 6/1975 | Bajorek et al. | 360/113 |
| 4,103,315 | 6/1977 | Hempstead et al. | 360/110 |
| 4,535,375 | 1/1983 | Mowry et al. | 360/113 |

*Primary Examiner*—S. J. Heinz
*Attorney, Agent, or Firm*—Otto Schmid, Jr.

[57] ABSTRACT

A magnetoresistive (MR) read transducer assembly in which the thin film MR layer is longitudinally biased only in the end regions by exchange bias developed by a thin film of antiferromagnetic material that is deposited in direct contact only in the end regions of the MR layer and a thin film of soft magnetic material which extends across the transducer assembly. The longitudinal bias is developed by exchange coupling between the thin film of antiferromagnetic material and both the MR layer and the thin film of soft magnetic material in the end regions. However, the thin film of soft magnetic material is separated from the MR layer in the central region only of the MR layer by a decoupling layer which interrupts the exchange coupling so that transverse bias is produced only in the central region upon connection of a bias source to conductor leads which are connected to the MR layer within the end region. The transverse bias is produced in that part of the central region of the MR layer in which the bias current and the decoupling layer are both present. Upon connection of a signal sensing means to the conductor leads, an output signal is sensed which detects resistance changes in the MR layer as a function of the fields which are intercepted by the MR layer.

13 Claims, 5 Drawing Figures

MAGNETORESISTIVE READ TRANSDUCER

BACKGROUND OF THE INVENTION

1. Field of the Invention

This invention relates in general to magnetic transducers for reading information signals from a magnetic medium and, in particular, to an improved magnetoresistive read transducer.

2. Description of the Prior Art

The prior art discloses a magnetic transducer referred to as a magnetoresistive (MR) sensor or head which has been shown to be capable of reading data from a magnetic surface at great linear densities. An MR sensor detects magnetic field signals through the resistance changes of a read element made from a magnetoresistive material as a function of the amount and direction of magnetic flux being sensed by the element.

In the past, principal problems with the MR sensors of unstable operating characteristics and Barkhausen noise have limited their use. These problems arise because there generally exist more than one stable state for the magnetization, a degeneracy which typically produces various multi-domain configurations. Random changes in this configuration are the cause of the above-mentioned unstable operating characteristics and Barkhausen noise.

The conceptual solution to these prior art problems was attained only recently through the implementation of patterned longitudinal bias. This solution is described and claimed in the commonly assigned patent application entitled Magnetoresistive Read Transducers by Ching H. Tsang, Ser. No. 766,157, filed 8-15-85 U.S. Pat. No. 4,663,685. Briefly, this invention advocates the creation of appropriate single domain states directly in the end regions only of the MR layer. This can be achieved by producing a longitudinal bias in the end regions only of the MR layer to maintain the end regions in a single domain state and these single domain states induce a single domain state in the central region of the MR layer. In a specific embodiment of this concept, a thin film of soft magnetic material is provided parallel to, but spaced from, the MR layer to also produce a transverse bias in the central region only of the MR layer to maintain the central region, where the output signal is sensed, in a linear response mode.

The introduction of the soft magnetic material, in the above-discussed specific embodiment, however, may create additional magnetic issues. Specifically, as this embodiment induces a single domain state only in the end regions of the MR layer but leaves the domain state in the end regions of the soft magnetic bias film undefined the total amount of magnetic flux coming in from the passive end regions is still undefined and some unstable operating characteristics and Barkhausen noise may still occur.

SUMMARY OF THE INVENTION

It is therefore the principal object of this invention to maintain the magnetization within the passive end regions of both the MR and the soft magnetic bias layers in a single domain state, so as to keep at a constant value the magnetic flux entering the central active region of the MR sensor from the passive end regions. In accordance with the invention, the objective is achieved by having within the passive end regions no nonmagnetic layer interposed between the MR layer and the soft magnetic bias layer so that an exchange biasing effect propagates from the longitudinal biasing layer through the MR layer to the soft magnetic bias layer.

In a specific embodiment, the magnetic read transducer assembly of the present invention comprises a thin film of magnetoresistive (MR) conductive layer formed of magnetic material and a nonmagnetic decoupling layer covering only the central region of the MR conductive layer. A thin film of soft magnetic material extends over and in contact with the end regions of the MR conductive layer and in contact with the decoupling layer in the central region so that the thin film of soft magnetic material is separated from the MR conductive layer in the central region but in contact with the MR layer in the end regions. A thin film of antiferromagnetic material is in direct contact with the end regions only of the thin film of soft magnetic material or the MR layer to produce a longitudinal bias in the end regions only by exchange biasing of level sufficient to maintain the end regions of the MR conductive layer and of the thin film of soft magnetic material in a single domain state with the single domain state of the end regions inducing a single domain state in the central region of the MR conductive layer. Spaced conductor means are connected to the MR layer within the end regions. A current source is provided for supplying a bias current to the conductor means to produce a current flow through the central region to magnetically bias the MR layer with transverse bias of a level sufficient to maintain the MR layer in a high sensitivity condition so that, upon connection of the conductor means to a signal sensing means, the signal sensing means determines the resistance changes in the MR layer as a function of the fields which are intercepted by the layer.

DESCRIPTION OF THE PREFERRED EMBODIMENTS

Figure 1:
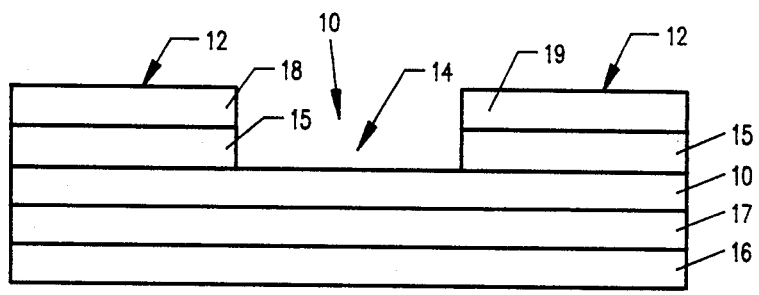
FIG. 1 is an end view of a specific embodiment of a prior art magnetoresistive read transducer assembly.

Prior to describing the present invention, a specific embodiment of the previously identified commonly assigned invention will be described briefly in conjunction with FIG. 1. The magnetic read head utilizes a magnetoresistive (MR) sensor 10, and the MR sensor can be divided into two regions, the central active region 14, where actual sensing of data is accomplished, and end regions 12. The invention recognizes that the two regions should be biased in different manners with longitudinal bias only in the end regions 12 and transverse bias in the active region 14. The longitudinal bias is produced by antiferromagnetic exchange bias layer 15 which is deposited to be in direct physical contact with MR layer 10. The transverse bias is produced by soft magnetic film layer 16 which is separated from the MR layer 10 by a thin nonmagnetic spacer layer 17 whose purpose is to prevent, within the active central region, a magnetic exchange bias between the MR layer and the soft magnetic bias film layer 16. The distance between the inner edges of conductors 18 and 19 comprise the part of the active region 14 over which the output signal is sensed.

This invention is based on the premise that with the end regions 12 in a single domain state, the central region 14 is forced into a single domain state so long as the longitudinally unbiased central region is not too long in comparison to the height of the sensor. This sensor design has been demonstrated to provide much more stable operating characteristics and suppression of Barkhausen noise than prior art designs without exchange biasing provisions, while at the same time not adversely affecting sensor sensitivity as with prior art designs having continuous exchange bias over the active and passive MR sensor segments.

Figure 2:
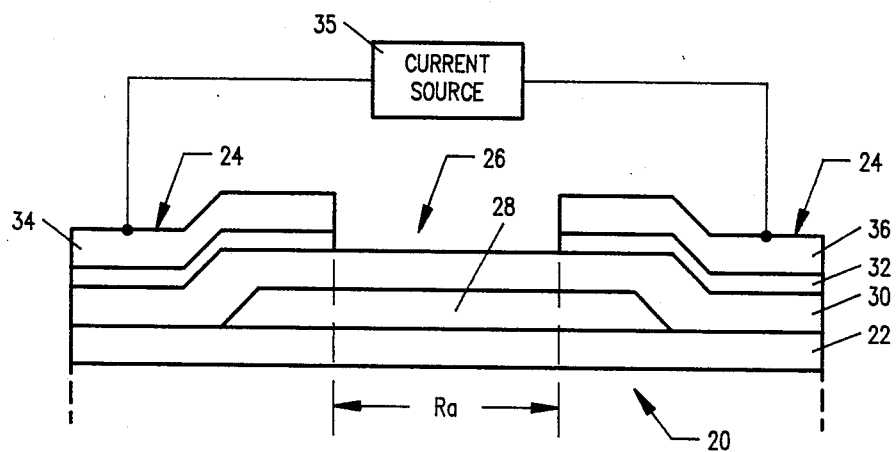
FIG. 2 is an end view of a specific embodiment of a magnetoresistive read transducer assembly according to the present invention.

With reference to FIG. 2, the magnetic read head assembly 20, according to the present invention, comprises a magnetoresistive (MR) sensor 22, and the MR sensor 22 is provided with longitudinal bias for domain suppression applied only to the end regions 24 and is provided with transverse bias for a linear response mode only in the central region 26 of the MR sensor 22. The active read region, over which the output signal is sensed, corresponds to the part of the central region 26 which is provided with transverse bias.

Figure 4:
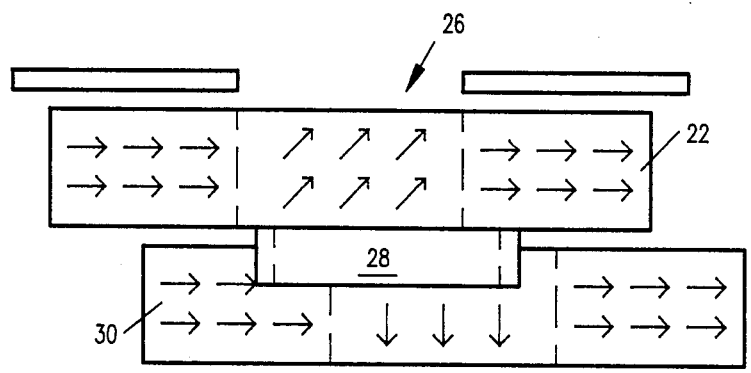
FIG. 4 is a exploded perspective view which shows the magnetization configuration of the thin film of soft magnetic material and the MR layer of magnetic read transducer assembly of FIG. 2.

The MR sensor 22 is first deposited over both end regions 24 and central region 26. Thin nonmagnetic spacer layer 28 is deposited only in the central region 26 and soft magnetic film layer 30 is deposited over both the end regions 24 and the central region 26. The soft magnetic film layer 30 is separated from MR sensor 22 in the central region 26 by thin spacer layer 28 so that a transverse bias can be produced only in the central region 26 of the MR sensor 22 to produce a linear response mode in MR sensor 22. Although the MR sensor 22 is shown as deposited first in FIG. 2, soft magnetic film layer 30 could as well be deposited first, followed by thin spacer layer 28 and then by the MR sensor 22. An antiferromagnetic layer 32 is deposited over the soft magnetic film layer 30 only in the end regions 24. Antiferromagnetic layer 32 creates an interfacial exchange interaction with the soft magnetic film layer 30 that results in an effective bias field experienced by soft magnetic film layer 30 and also by the MR sensor 22 which is in contact with the soft magnetic film layer 30. The resulting bias field is oriented longitudinally for domain suppression as is shown in FIG. 4. Conductor leads 34 and 36, over which the output signal is sensed, are deposited only in the end regions 24 over the antiferromagnetic layer 32.

A bias current source 35 is connected between conductor leads 34 and 36 to produce a bias current in the central region 26 of the MR sensor 22 to magnetically bias the MR sensor with transverse bias. The transverse bias is produced in that part of the central region 26 of the MR sensor 22 in which the bias current and the thin spacer layer 28 are both present. The transverse bias produces magnetization at a chosen angle, as shown in FIG. 4, in the central region 26 of the MR sensor 22 so that the MR sensor 22 is maintained in a high sensitivity condition. In the embodiment shown in FIG. 2, the transverse bias is provided in a central active region Ra.

Figure 3:
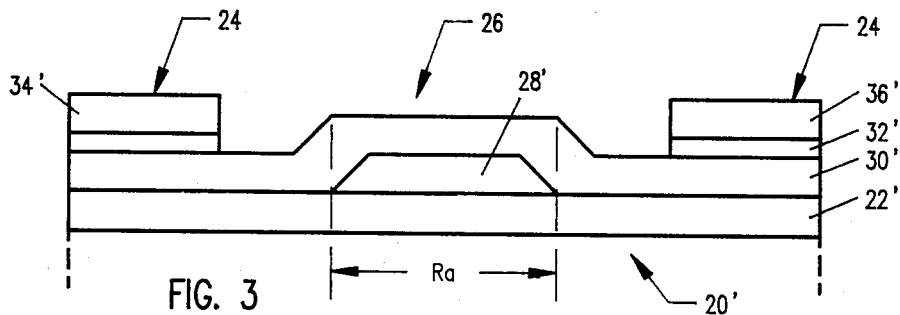
FIG. 3 is an end view of an alternate embodiment of a magnetoresistive read transducer assembly according to the present invention.

An alternate embodiment of the MR read transducer assembly, according to the present invention, is shown in FIG. 3. In this embodiment, the MR layer 22' is deposited as before, but, in this embodiment, the extent of the thin non-magnetic spacer layer 28' is less than the extent of the conductor leads 34' and 36' and antiferromagnetic layer 32'. The central active region Ra is again defined by the extent of the MR sensor within the central region in which a bias current and thin spacer layer 28' are present. In common with the embodiment shown in FIG. 2, the position of the MR sensor 22' and the soft magnetic film layer 30' can be reversed, if desired.

Figure 5:
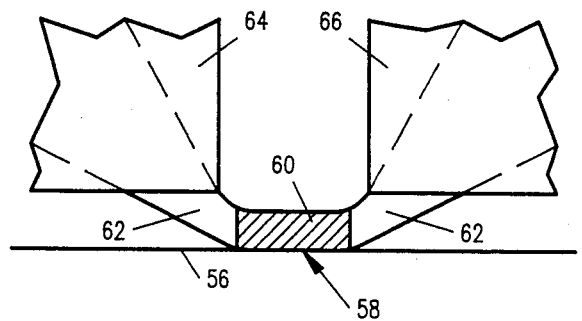
FIG. 5 is a plan view of an alternate embodiment of the magnetoresistive read transducer according to the present invention.

A further embodiment of the MR read transducer assembly is shown in FIG. 5 in which the MR read transducer assembly has a sensing edge 56 which is closely spaced from the magnetic medium during normal operation. In this embodiment the MR element 58 is shaped so that only the active central region 60 of the sensor extends to the sensing edge. The active region (shown shaded in the drawing) 60 is defined by the extent of the spacer member in common with the embodiment shown in FIG. 3. The end regions 62 of the MR element 58 are tapered as the distance from the central region is increased and tilted away from the sensing edge, and conductor leads 64 and 66 are in contact with the end regions 62 away from the sensing edge.

The embodiment of the MR read transducer assembly shown in FIG. 5 has the advantage of less sensitivity to its operating environment since only the central region of the MR element extends to the sensing edge. The fact that the conductor leads do not extend to the sensing edge eases mechanical problems, and the tapering and tilting of the MR sensor in the end regions leads to reduced side reading. Since any deterioration of the MR sensor/conductor lead electrical contact adversely affects the sensitivity profile, this design prevents deterioration since the electrical contact is not exposed at the sensing edge.

The magnetic read head embodying the present invention can be fabricated by any suitable method known to those skilled in the art. In a specific embodiment, a thin film of a suitable MR material such as NiFe, for example, a patterned thin film spacer layer of a suitable material such as Ta, for example, a soft magnetic film layer of a suitable material such as NiFeRh, for example, a layer of antiferromagnetic material such as MnFe, for example, and conductive leads are deposited upon a suitable substrate in successive layers which are appropriately patterned using lithographic thin film processing techniques known to those skilled in the art.

It can be seen that the magnetic read head embodying the present invention has a soft film transverse bias exclusively in the active central region of the head since the spacer layer served to break the exchange coupling between the MR sensor and the soft magnetic film. The use of the present invention increases the range of stable operation relative to the various disturb conditions. It also self-initiates the proper magnetization configuration thereby eliminating the need for device initialization.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A magnetic read transducer assembly comprising:
   a thin film of magnetoresistive conductive layer formed of magnetic material, said magnetoresistive conductive layer having end regions separated by a central region;
   a nonmagnetic decoupling layer covering only said central region of said magnetoresistive conductive layer;
   a thin film of soft magnetic material extending over said end regions and said central region of said magnetoresistive conductive layer, said thin film of soft magnetic material being parallel to and in contact with said decoupling layer and separated from said magnetoresistive layer in said central region by said decoupling layer, said thin film of soft magnetic material being in contact with said magnetoresistive layer in said end regions to form end region magnetic assemblies;
   means for producing a longitudinal bias, said means for producing a longitudinal bias being in direct contact with each of said end region magnetic assemblies to produce a longitudinal bias in said end regions only of a level sufficient to maintain said end region magnetic assemblies in a single domain state, said single domain states of said end region magnetic assemblies thereby inducing a single domain state in said central region of said magnetoresistive conductive layer;
   spaced conductor means electrically connected to said magnetoresistive layer within said central region; and
   means for supplying a bias current to said conductive means to magnetically bias said magnetoresistive layer with transverse bias in the part of said central region in which said bias current and said decoupling layer are both present, said transverse bias being of a level sufficient to maintain said magnetoresistive layer in a high sensitivity condition whereby, upon connection of said conductive means to a signal sensing means, said signal sensing means determining the resistance changes in said magnetoresistive layer as a function of the fields which are intercepted by said magnetoresistive layer.

2. The magnetic read transducer assembly of claim 1 wherein said thin film of magnetoresistive conductive layer is NiFe.

3. The magnetic read transducer assembly of claim 1 wherein said means for producing a longitudinal bias comprising a thin film of antiferromagnetic material in direct contact with said end region magnetic assemblies to produce uninterrupted exchange coupling between said antiferromagnetic material and both said magnetoresistive layer and said thin film of soft magnetic material.

4. The magnetic read transducer assembly of claim 3 wherein said thin film of antiferromagnetic material is MnFe.

5. The magnetic read transducer assembly of claim 1 wherein said thin film of soft magnetic material is NiFeRh.

6. The magnetic read transducer assembly of claim 1 wherein said decoupling layer is Ta.

7. The magnetic read transducer assembly of claim 1 additionally comprising;
   said magnetic read transducer having a sensing edge;
   said thin film of magnetoresistive conducting layer being shaped so that only the central region of said magnetoresistive layer extends to said sensing edge.

8. The magnetic read transducer assembly of claim 7 wherein said thin film of magnetoresistive conducting layer in said end regions is tilted away from said sensing edge.

9. The magnetic read transducer assembly of claim 7 wherein said thin film of magnetoresistive conducting layer in said end regions is tapered to become wider as the distance from said central region is increased.

10. The magnetic read transducer assembly of claim 7 wherein said thin film of magnetoresistive conductive layer is NiFe.

11. The magnetic read transducer assembly of claim 7 wherein said thin film of soft magnetic material is NiFeRh.

12. The magnetic read transducer of claim 7 wherein said means for producing a longitudinal bias comprising a thin film of antiferromagnetic material in direct contact with said end region magnetic assemblies to produce uninterrupted exchange coupling between said antiferromagnetic material and both said magnetoresistive layer and said thin film of soft magnetic material.

13. The magnetic read transducer assembly of claim 12 wherein said thin film of antiferromagnetic material is MnFe.

* * * * *